Patented May 17, 1938

2,117,305

UNITED STATES PATENT OFFICE 2,117,305

PROTECTION OF FOOTWEAR AND OTHER ARTICLES

Adrian H. Feikert, Akron, Ohio, assignor to American Anode, Inc., Akron, Ohio, a corporation of Delaware No Drawing. Application July 9, 1935,
Serial No. 30,517

8 Claims. (Cl. 12—142)

This invention relates to the protection of articles during manufacture, shipping and storage, and is especially useful in protecting articles of footwear or other articles which frequently embody expensive and highly finished leathers and other materials which are easily damaged in the course of manufacture or while in transit or storage awaiting sale. The invention contemplates providing upon such articles adherent but readily removable temporary protective coatings of rubber by a method which eliminates spotting, discoloration, impairment of surface finish and other damage to the leather by the coating material which has accompanied prior processes.

In the manufacture of articles of footwear such as expensive shoes for women, highly finished, light colored and otherwise sensitive and easily damaged leathers frequently are utilized for various parts of the shoe, especially the uppers. Even though a high degree of care is exercised in handling such materials during manufacture of the shoe, they are often scuffed or become soiled by dirt or grease from the shoe making machinery and other equipment and are considerably reduced in value, for even though the shoe may be cleaned, the finish of the material usually is impaired at the spots which were cleaned. In an attempt to overcome this difficulty it has heretofore been proposed to coat the easily damaged material with an aqueous dispersion of rubber such as natural rubber latex and to dry the dispersion to provide upon the material an adherent but removable coating of rubber to serve as a protective means during manufacture and storage of the shoe part or the finished shoe. This process has proved to be very satisfactory with some types of shoes and materials and has met with considerable favor in the shoe manufacturing industry, but it has not proved to be entirely satisfactory for use in coating shoes or shoe parts including smooth surfaced highly finished leathers such as glazed kid, finished calf and similar leathers which are easily spotted, discolored or otherwise damaged by water, for the reason that the aqueous vehicle of the rubber latex or other aqueous dispersion itself spots or discolors the leather and causes damage often equal to or more serious than that which would be caused by grease and dirt or by mechanical scuffing.

The present invention entirely overcomes and eliminates this prior difficulty and makes possible the use of latex or other aqueous dispersion of rubber in coating the most sensitive leathers by coating the leather before application of the aqueous dispersion with a thin, water-repellent film of rubber in a non-aqueous liquid vehicle such as a volatile organic solvent for rubber. The solution or dispersion of rubber in such a solvent, commonly called "rubber cement", may be applied directly to the leather surface without damaging its finish in any way, and a heavier coating of rubber deposited in situ from an aqueous dispersion of rubber may be superposed to provide an adherent but readily strippable laminar protective coating. The cement coating alone will not provide a satisfactory protective coating because the cement cannot practically be applied in quantities sufficient to build up a coating of adequate thickness and strength to provide the requisite protection, and further because the dried cement film is substantially less tough and strong than is rubber deposited in situ from latex, for example, and the dried cement film is more likely to tear during stripping than is the latex film which resists much greater tearing stresses. This is of considerable practical importance because it is highly desirable to be able to strip the protective coating from the finished shoe in one piece rather than tediously to pick off a number of pieces as is the case when the rubber film tears easily. However, by first applying a thin film of rubber cement and then superposing a thicker and heavier coating of unmasticated latex rubber deposited in situ from latex, it is possible to secure the superior protective characteristics of the latex rubber coating without suffering its usual attendant disadvantages.

In a specific example of the manner of practicing the present invention, an upper for a woman's slipper is formed in the usual manner from a glazed kid leather. The upper, before it is lasted, is sprayed or otherwise uniformly but thinly coated on its finished side with a rubber cement containing 10 parts by weight of "pale-crepe" rubber dissolved in 100 parts of gasoline. Immediately, if desired after some drying of the cement, a coating of liquid rubber latex containing 50 to 60% total solids is sprayed onto the coated leather. The latex preferably, although not necessarily, is sprayed together with a coagulant for the latex as described in an application of Merrill E. Hansen, Serial No. 725,306, filed May 12, 1934, or it may be applied by brushing, dipping or otherwise, to build up a coating of the desired thickness, usually about 0.01 inch. The latex then is dried, and the coated upper is lasted and construction of the shoe is continued in the usual manner. At any time after the shoe is finished, the protective rubber coating may be stripped off in a single piece to expose the undamaged shoe.

In a second example, a shoe including an upper formed of water-sensitive leather is constructed according to conventional methods. The outer surface of the finished shoe then is uniformly coated with rubber cement containing 6 parts by weight of rubber dissolved in 100 parts of carbon-tetrachloride. When the cement has dried for a few moments, a coating of liquid rubber latex is superposed by spraying and the latex is dried to provide a coherent laminar coating adhering to the shoe and furnishing efficient protection until such time as it may be desirable to strip the coating off.

It will be understood that the leather treated according to the process of this invention must not be of the type having a surface covered with upstanding long fibers or similar surfaces to which the rubber cement would adhere so tenaciously as to render stripping impossible, and that the utility of the invention is limited to the coating of leathers and other materials having a surface of such character that rubber cement will not adhere so tenaciously as to render stripping of the dried film impossible.

The term "rubber cement" as used in the specification and claims is intended to include all solutions or dispersions of rubber and analogous natural gums and resins and also similar synthetic or artificial materials such as polymerized vinyl compounds and the like in solvents therefore including the common volatile organic solvents such as gasoline, naphtha, carbontetrachloride and the like. The rubber cement may contain added materials such as alcohols, waxes, or other materials which are commonly added to modify the properties of the cement. Similarly the term "aqueous dispersion of rubber" includes all natural and artificial aqueous dispersions of rubber and analogous gums and resins, whether in the unvulcanized, vulcanized, or reclaimed condition, and either concentrated, diluted, thickened, thinned, compounded, uncompounded, stabilized, or otherwise preliminarily treated or conditioned.

Numerous modifications and variations may be made in details of the procedure and materials hereinabove described without departing from the scope of the invention as defined by the appended claims.

I claim:

1. A method of manufacturing an article of footwear including easily damaged material to which dried rubber cement does not adhere so tenaciously as to render subsequent stripping impossible, which comprises applying to said easily damaged material a thin coating of rubber cement, superposing a coating of an aqueous dispersion of rubber, drying the aqueous dispersion to provide an adherent but strippable protective coating of rubber upon said material, incorporating the coated material into an article of footwear, and thereafter stripping the protective coating from the article.

2. A method of manufacturing an article of footwear including smooth highly finished leather likely to be damaged during manufacture of the article and which also is easily damaged by water, which comprises applying to said leather a coating of rubber cement substantially thinner than a desired protective coating, superposing a coating of an aqueous dispersion of rubber, drying the aqueous dispersion to provide an adherent but readily strippable protective coating of rubber upon said material, incorporating the coated material into an article of footwear, and thereafter stripping the protective coating from the article.

3. The method of providing leather having a smooth surface finish easily damaged by water with an adherent but readily strippable coating of rubber deposited in situ from an aqueous dispersion of rubber without damaging the leather which comprises applying to said leather a film of rubber cement substantially thinner than the desired coating, superposing a coating of an aqueous dispersion of rubber, and drying the aqueous dispersion to provide the desired adherent rubber coating.

4. A method of providing a temporary protective coating comprising rubber upon an article having a surface likely to be damaged by water but to which deposited rubber compositions do not adhere so tenaciously as to render impossible subsequent stripping of a laminar coating comprising the at least partially dried residue of such a composition as a first layer contiguous the surface of the article, which comprises first applying to said surface a coating of a composition comprising rubber in a non-aqueous water-repellent fluid vehicle which will not damage the surface of the article, and thereafter superposing a coating of an aqueous dispersion of rubber and drying the composite coating.

5. An article of footwear including easily damaged material to which dried rubber cement does not adhere so tenaciously as to render subsequent stripping impossible, and comprising upon said easily damaged material an adherent thin coating of rubber having the characteristics of rubber deposited from a rubber cement and superposed thereover an adherent coating of rubber having the characteristics of rubber deposited in situ from an aqueous dispersion of rubber constituting an adherent but strippable laminar protective coating.

6. An article of footwear including smooth highly finished leather normally subject to easy damage and comprising upon said leather an adherent thin coating of rubber having the characteristics of rubber deposited from a rubber cement and superposed thereover an adherent coating of rubber having the characteristics of rubber deposited in situ from an aqueous dispersion of rubber constituting an adherent but readily strippable laminar protective coating.

7. Leather having a smooth highly finished surface easily damaged by water and comprising thereon an adherent and readily removable laminar protective covering comprising a film of rubber having the characteristics of rubber deposited from rubber cement contiguous the leather and superposed thereover an adherent coating of rubber having the characteristics of rubber deposited in situ from an aqueous dispersion of rubber.

8. An article of manufacture including material easily damaged by water and to which rubber cement does not adhere tenaciously under ordinary conditions, and comprising upon said easily damaged material an adherent and readily strippable laminar protective coating comprising a film of rubber having the properties of rubber deposited from a rubber cement contiguous said material and superposed thereover an adherent coating of rubber having the characteristics of rubber deposited in situ from an aqueous dispersion of rubber.

ADRIAN H. FEIKERT.